(12) United States Patent
Nikolai et al.

(10) Patent No.: US 7,224,986 B2
(45) Date of Patent: May 29, 2007

(54) METHOD OF EVALUATING A LOCATION OF A MOBILE STATION WITHIN A CELLULAR TELECOMMUNICATION NETWORK

(75) Inventors: Dirk Nikolai, Korntal-Münchingen (DE); Matthias Schreiner, Malmsheim (DE); Michael Hother, Ludwigsburg (DE)

(73) Assignee: Evolium S.A.S., Paris (FR)

( * ) Notice: Subject to any disclaimer, the term of this patent is extended or adjusted under 35 U.S.C. 154(b) by 131 days.

(21) Appl. No.: 11/002,421

(22) Filed: Dec. 3, 2004

(65) Prior Publication Data

US 2005/0136948 A1 Jun. 23, 2005

(30) Foreign Application Priority Data

Dec. 18, 2003 (EP) ................................. 03293220

(51) Int. Cl.
*H04Q 7/20* (2006.01)
(52) U.S. Cl. ................................... 455/456.1
(58) Field of Classification Search ............. 455/404.2, 455/456.1
See application file for complete search history.

(56) References Cited

U.S. PATENT DOCUMENTS

| | | | | |
|---|---|---|---|---|
| 5,924,034 A * | 7/1999 | Dupuy | ........................ | 455/440 |
| 5,974,329 A * | 10/1999 | Wylie et al. | .............. | 455/456.1 |
| 6,052,597 A * | 4/2000 | Ekstrom | .................. | 455/456.3 |
| 6,097,336 A | 8/2000 | Stilp | | |
| 6,097,959 A * | 8/2000 | Yost et al. | ................ | 455/456.2 |
| 6,161,018 A | 12/2000 | Reed et al. | | |
| 2003/0036390 A1 | 2/2003 | Villier et al. | | |
| 2004/0198386 A1* | 10/2004 | Dupray | ..................... | 455/456.1 |
| 2004/0203921 A1* | 10/2004 | Bromhead et al. | ........ | 455/456.1 |
| 2005/0053099 A1* | 3/2005 | Spear et al. | ................. | 370/508 |

* cited by examiner

*Primary Examiner*—Nick Corsaro
*Assistant Examiner*—Joel Ajayi
(74) *Attorney, Agent, or Firm*—Sughrue Mion, PLLC

(57) ABSTRACT

A method of evaluating a location of a mobile station within a cellular telecommunication system is described.

A cell is associated with a base station (BS). The mobile station (MS) is located within the cell. A timing advance (TA) is evaluated by the base station (BS).

The method comprises the following steps:
evaluating a direct distance (rd) between the mobile station (MS) and the base station (BS) for a number of locations (L) of the mobile station (MS) within the cell,
evaluating common values depending on the direct distances (rd), and
evaluating an estimated direct distance (rd*) of the mobile station (MS) from the base station (BS) depending on the common values.

12 Claims, 3 Drawing Sheets

METHOD OF EVALUATING A LOCATION OF A MOBILE STATION WITHIN A CELLULAR TELECOMMUNICATION NETWORK

BACKGROUND OF THE INVENTION

The invention is based on a priority application EP03293220.4 which is hereby incorporated by reference.

The invention relates to a method of evaluating a location of a mobile station within a cellular telecommunication network wherein a cell is associated with a base station, wherein the mobile station is located within the cell and wherein a timing advance is evaluated by the base station. The invention also relates to a corresponding base station and to a corresponding cellular telecommunication network.

A cellular telecommunication network, e.g. the Global System for Mobile Communication (GSM), is built up of a number of cells. The surface covered by all cells defines the operating area of the network. Each cell is associated with at least one base station. A mobile station being located within a specific cell, can therefore communicate with at least one base station belonging to this cell.

In connection with so-called location-based services, it is necessary to evaluate the actual location of a mobile station within the cell. For example, if all hotels in the vicinity of the actual location of a user of the mobile station shall be-provided to this user, the actual location of this user must be evaluated in order to carry out this location-based service.

It is known to evaluate the location of a mobile station within a cell as a function of a timing advance of the mobile station.

This timing advance is defined by each base station belonging to the cell and forwarded to the mobile station. The timing advance corresponds to that time duration which is required for sending data from the mobile station to the base station. In order to arrive at the base station at a predefined point in time, the mobile station must send its data prior to this point in time, i.e. with the given timing advance.

As described, the timing advance corresponds to the time duration required for transmitting data from the mobile station to the base station. The timing advance, therefore, depends on the distance of the mobile station to the base station. This results in the following known equation:

$$rk = k \times TA + \text{offset} \quad \text{(equation A)}$$

with rk=distance from mobile station to base station,
k=constant value=e.g. 554 meters for GSM,
TA=0, 1, 2, . . . =timing advance,
offset=constant distance, e.g. k/2 or k/4.

With the timing advance being evaluated by the base station as described above, the distance of the mobile station from the base station can be calculated with the above equation. Based on this distance, the location of the mobile station can then be evaluated and used in connection with location-based services.

However, the distance calculated with the above equation does not exactly correspond to the actual distance of the mobile station from the base station. This comes from the fact that the evaluation of the timing advance is not based on the shortest distance between the mobile station and the base station but on the actual transmission path between the mobile station and the base station including all diversions of the transmitted data due to reflexions and the like.

Therefore, the distance calculated with the above equation usually is longer than the actual distance between the mobile station and the base station.

SUMMARY OF THE INVENTION

It is an object of the invention to provide a method of evaluating the distance between the mobile station and the base station more accurately.

This object is solved by a method according to claim 1. The object is also solved by a base station according to claim 8 and by a cellular telecommunication network according to claim 9.

The invention provides a simple, but accurate possibility to evaluate the distance between the mobile station and the base station. The evaluated distance can then be used for evaluating the location of the mobile station and its user for example in connection with location-based services. The accuracy of the evaluated distance and therefore the resulting location may be increased up to 20 percent compared to the described known evaluation.

Further features, applications and advantages of the invention will become apparent from the following description of exemplary embodiments of the invention which are shown in the drawings. There, all described and shown features themselves or in any combination represent the subject-matter of the invention, independently of their wording in the description or their representation in the drawings and independently of their combination in the claims or the dependencies of the claims.

In the following description, the cellular telecommunication system is realized by the Global System for Mobile Communication (GSM). Of course, the cellular telecommunication system may also be realized by any other kind of technique, e.g. by the Universal Mobile Telecommunications System (UMTS). In the latter case, the described timing advance has to be replaced e.g. by the so-called round-trip-time or the like.

Figure 1:
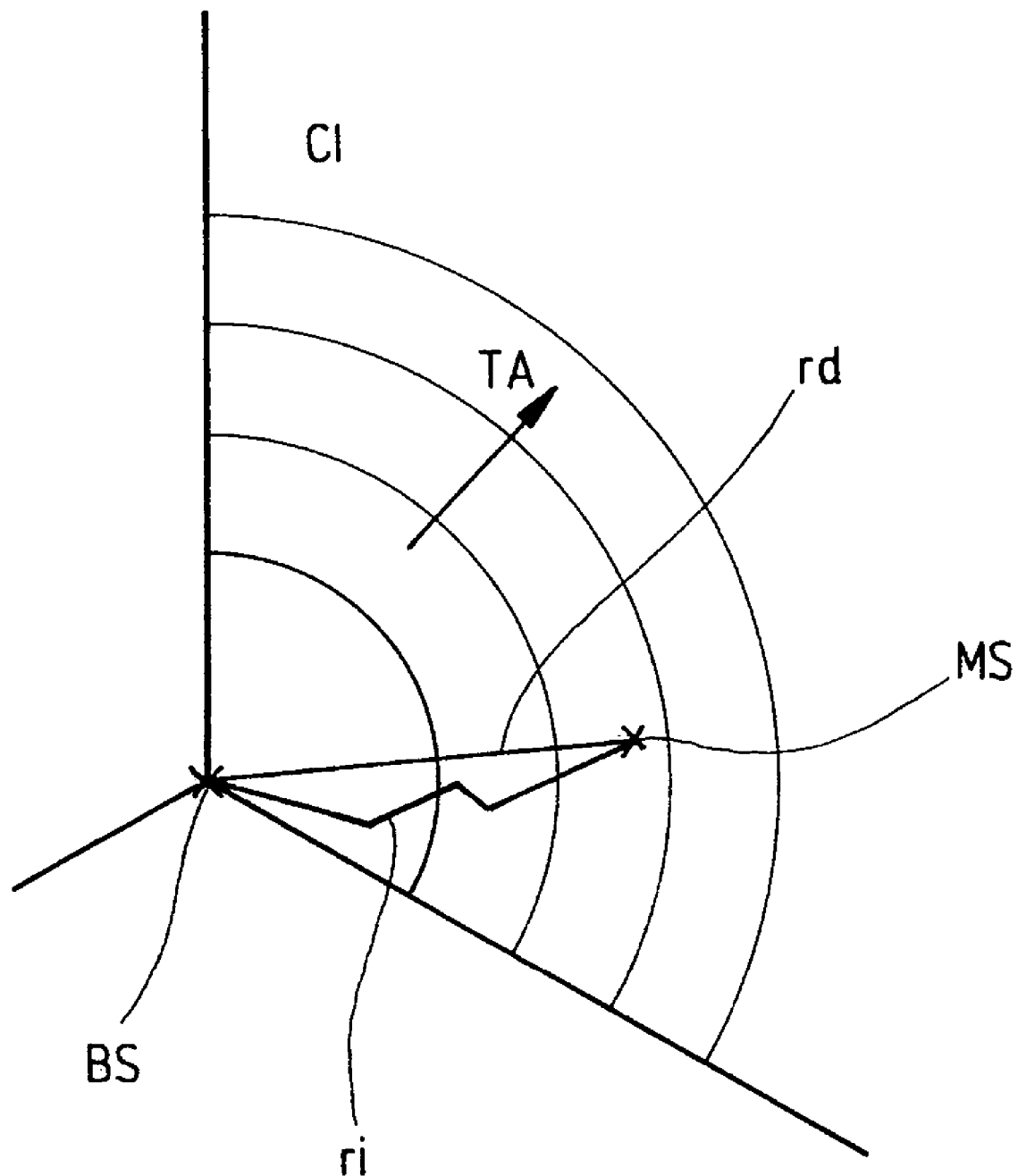
FIG. 1 of the drawings shows a schematic representation of a cell of a cellular telecommunication network.

In FIG. 1, a base station BS is shown which is associated with a cell having a cell identifier CI. A mobile station MS is located within the cell CI. A timing advance TA as already described, is represented in FIG. 1 as an arrow wherein the value of the timing advance TA increases by 1 in the direction of the arrow with every one of the shown angular ring segments.

A direct distance rd between the base station and the mobile-station MS is shown in FIG. 1. This distance rd is often called the line of sight between the base station BS and the mobile station MS. Furthermore, an indirect distance ri between the base station BS and the mobile station MS is shown in FIG. 1 which is the true transmission path from the base station BS to the mobile station MS including all diversions.

Figure 2:
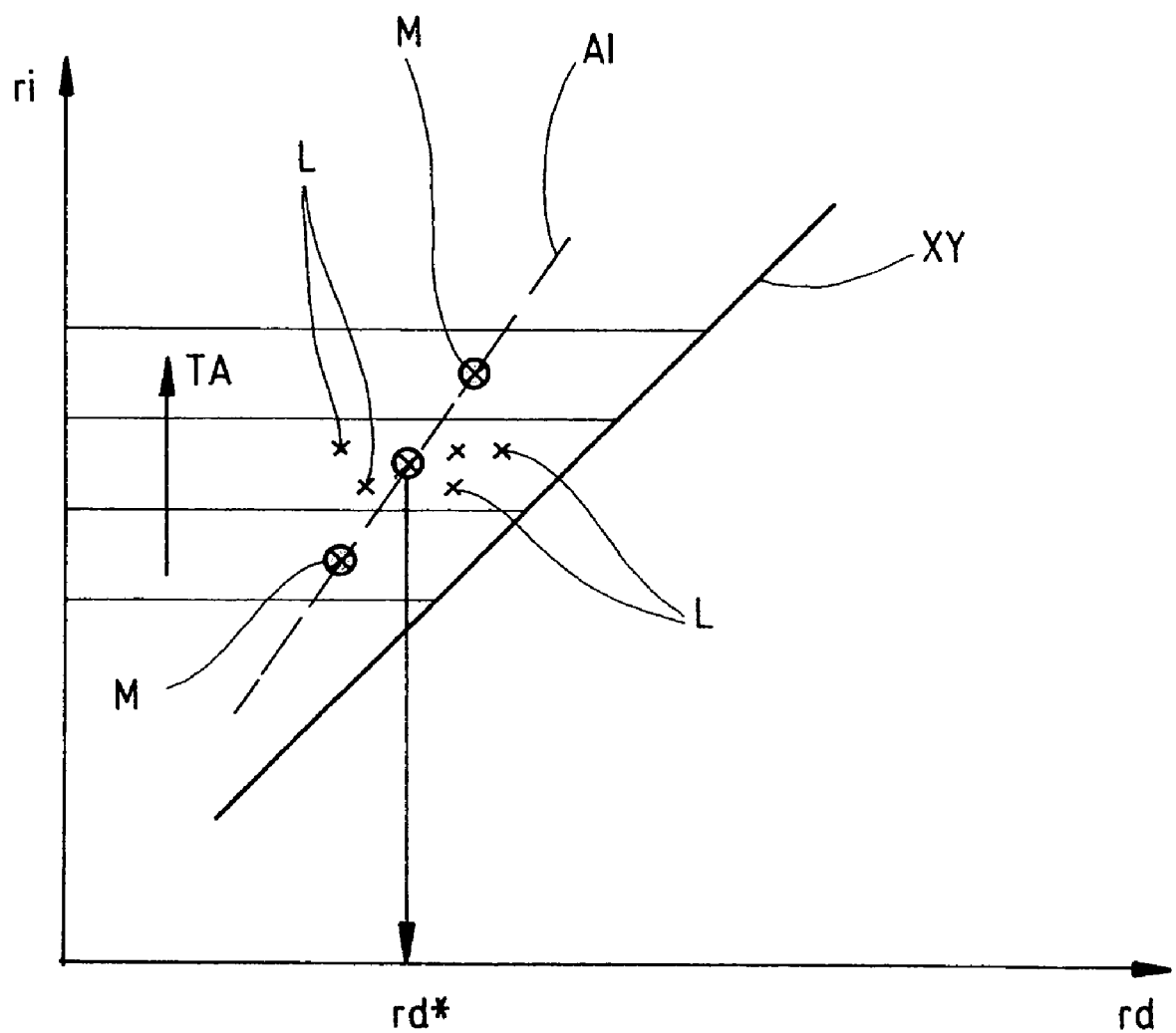
FIG. 2 shows a schematic diagram comprising a direct distance and an indirect distance between a base station and a mobile station.

The direct distance rd and the indirect distance ri constitute the axes of the diagram of FIG. 2. As well, the timing advance TA is shown in FIG. 2. As the timing advance TA comprises all diversions of a transmission path, the timing advance TA is directed into the same direction as the indirect distance ri.

It is known to use a so-called network planning tool for planning a telecommunication network. For example, the optimal location of a specific base station within a cellular telecommunication network as well as the coverage of this base station can be evaluated by a network planning tool.

In this connection, it is known that a network planning tool is able to evaluate the direct distance rd between a base station and a specific mobile station being located within the respective cell. It is also known that this direct distance rd between a base station and a mobile station may be evaluated with the help of the Global Positioning System (GPS).

In a first step, the direct distances rd between the base station BS and the mobile station MS are evaluated for a number of locations L within the cell CI with the help of a network planning tool or with the help of the Global Positioning System (GPS). In this first step, the locations L are selected such that the timing advance TA of these locations L is always the same. Some exemplary locations L are shown in FIG. 2. Their direct distances rd is equal to the corresponding values on the x-axis of the respective locations L.

It is mentioned that the direct distance rd of a specific location L is always equal or less as the indirect distance ri of this location L. Therefore, all locations L are present above a line XY which represents the bisecting line between the x-axis and the y-axis of the diagram of FIG. 2.

In a second step, the distances rd of all locations L with the same timing advance TA are averaged. The result is a mean distance for this timing advance TA. This mean distance for the relevant timing advance TA is shown in FIG. 2 as a location M.

In further steps, the first and the second step are repeated for all possible timing advances TA with the result that a number of mean distances are evaluated for the corresponding timing advances TA. In FIG. 2, three locations M are shown representing three mean distances for three consecutive timing advances T.

Then, a function is evaluated for connecting all locations M of FIG. 2. This function is of the following general type representing any kind of curve:

$$a0+a1 \times TA+a2 \times TA^2+a3 \times TA^3+\ldots \quad \text{(equation B)}$$

As well, the function may represent a straight line as follows:

$$a0+a1 \times TA \quad \text{(equation C)}.$$

The values a0, a1, a2, a3, ... are calculated with the help of known mathematical and/or statistical methods and/or models based on the locations M representing the mean distances for the respective timing advances TA.

As a result of the described method, a set of values a0, a1, a2, a3, ... is present which represents a curve or—as shown in FIG. 2—a straight line AI which connects all locations M, i.e. all mean distances.

All these measures can be carried out e.g. before the telecommunication network is taken into operation.

Then, after the telecommunication network is taken into operation, the actual location of a mobile station MS can be evaluated as follows:

The timing advance TA being relevant for the mobile station MS is evaluated as described by the base station BS. Then, an estimated direct distance rd* of the mobile station MS from the base station BS is calculated based on the values a0, a1, a2, a3, ... as determined for the relevant cell CI according to the above description and based on the evaluated timing advance TA. In general, the estimated direct distance rd* may be calculated as follows:

$$rd^*=a0+a1 \times TA+a2 \times TA^2+a3 \times TA^3+\ldots \quad \text{(equation D)}.$$

In the example as shown in FIG. 2, the estimated direct distance rd* is calculated as follows:

$$rd^*=a0+a1 \times TA \quad \text{(equation E)}.$$

This estimated direct distance rd* is shown in FIG. 2.

Finally, the actual location of the mobile station MS is evaluated with the help of the estimated direct distance rd* and known methods for location determination e.g. the transmission angle of the base station BS.

Figure 3:
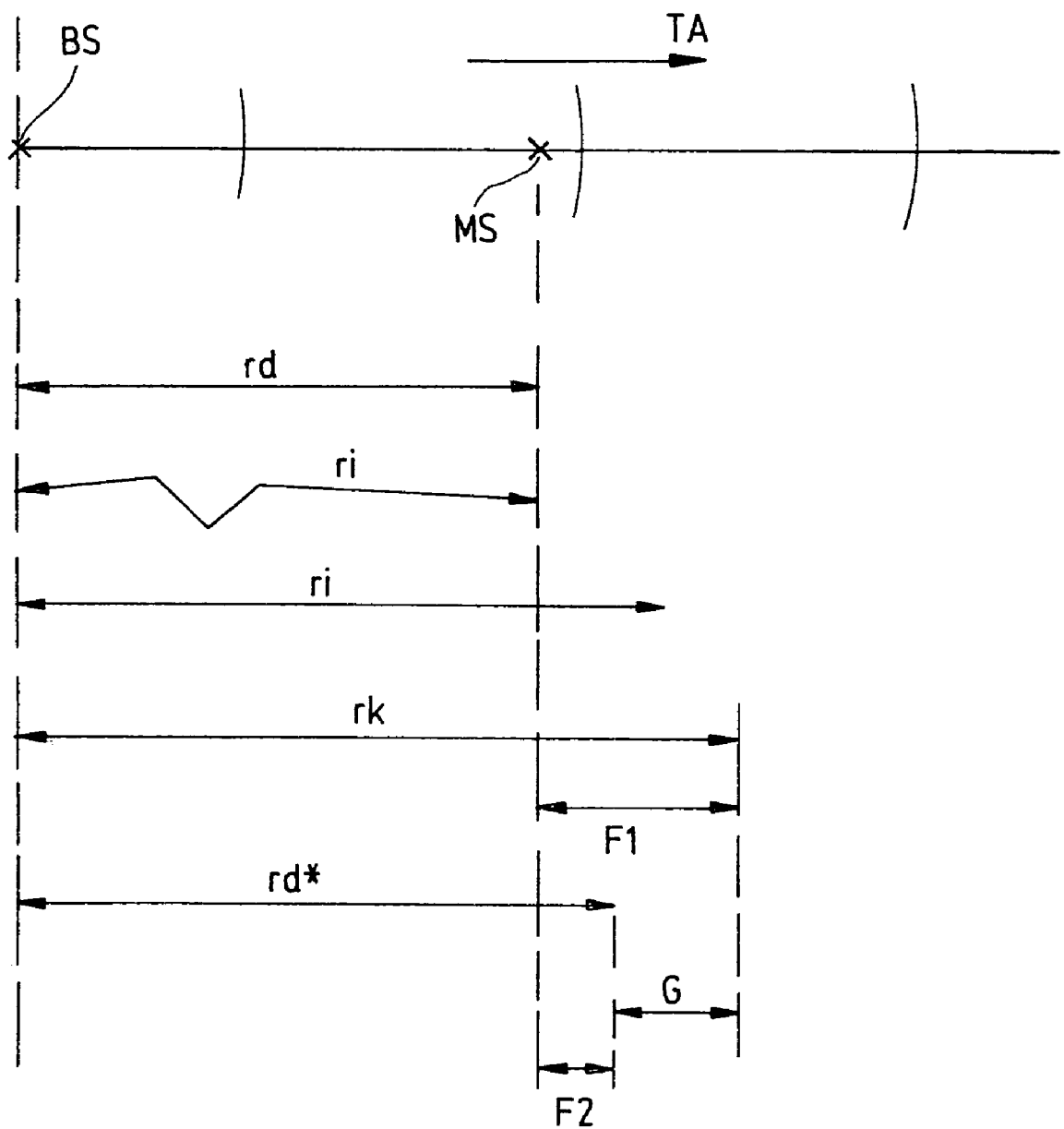
FIG. 3 shows a schematic representation of the aforementioned and other distances.

In FIG. 3, the correlations between the different distances are shown which shall be described now.

At the top of FIG. 3, the base station BS and the mobile station MS are shown. As well, the timing advance TA is depicted as an arrow.

Below, the direct distance rd is shown as the shortest line between the base station BS and the mobile station MS.

Then, the indirect distance ri is shown firstly as a line with several angles representing some diversions, and secondly, below, as a straight line. Due to the diversions, the straight line of the indirect distance ri is longer than the direct distance rd.

For comparison purposes, the distance rk as calculated with equation A is shown. This distance rk is apparently longer than the straight line of the indirect distance ri. Furthermore, a difference F1 is shown in FIG. 3 between the direct distance rd and the calculated distance rk.

Then, the estimated direct distance rd* is shown in FIG. 3. This distance rd* is evaluated as described above, in particular based on the values a0, a1, a2, a3, ... as described in connection with FIG. 2. For example, the estimated direct distance rd* is calculated according to equation E.

Apparently, the estimated direct distance rd* is shorter than the calculated distance rk, the difference being abbreviated as G. As a consequence, the difference F2 between the estimated direct distance rd* and the direct distance rd is less than the difference F1.

In addition to the described steps, the set of values a0, a1, a2, a3, ... can be classified depending on one or more characteristics of the cell CI. For example, if the cell CI covers e.g. a city, then the corresponding set of values a0, a1, a2, a3, ... is taken as a representative for an urban cell. However, if the cell CI covers a countryside, then the corresponding set of values a0, a1, a2, a3, ... is taken as a representative for a rural cell. Again, this classification can be carried out e.g. before the telecommunication network is taken into operation.

Then, e.g. if a new base station and therefore new cells are introduced in the telecommunication network, it can be evaluated whether this new cell has an urban or rural character. Depending on this evaluation, the corresponding set of values a0, a1, a2, a3, ... can be assigned to this new cell without any further evaluations.

The described methods may be carried out anywhere within the cellular telecommunication network. In particular, the evaluations are performed by the base station BS or by a specific server within the cellular telecommunication network being connected to the base station BS.

The invention claimed is:

1. A method of evaluating a location of a mobile station within a cellular telecommunication system, wherein a cell is associated with a base station (BS), wherein the mobile station is located within the cell and wherein a timing advance is evaluated by the base station, comprising the following steps:

evaluating a direct distance between the mobile station and the base station for a number of locations of the mobile station within the cell, evaluating common values depending on the direct distances, and evaluating an estimated direct distance of the mobile station from the base station depending on the common values;

wherein the estimated direct distance is generally evaluated as follows:

$$rd^* = a0 + a1 \times TA + a2 \times TA^2 + a3 \times TA^3 + \ldots$$

wherein a0, a1, a2, a3, . . . are the evaluated common values and TA is the evaluated timing advance.

2. The method of claim 1 comprising the following further steps:

evaluating mean distances from the direct distances and evaluating the common values based on the mean distances.

3. The method of claim 2 comprising the following further steps:

evaluating the mean distances for the same timing advance and evaluating the common values based on the mean distances of the different timing advances.

4. The method of claim 1 wherein the estimated direct distance is calculated as follows:

$$rd^* = a0 + a1 \times TA$$

wherein a0, a1 are the evaluated common values and TA is the evaluated timing advance.

5. The method of claim 1 wherein the direct distance is evaluated with the help of a network planning tool and/or the Global Positioning System.

6. The method of claim 1 wherein the common values are evaluated with the help of mathematical and/or statistical methods and/or models.

7. A base station of a cellular telecommunication system for evaluating a location of a mobile station within the cellular telecommunication system, wherein a cell is associated with the base station, wherein the mobile station is located within the cell, wherein a timing advance is evaluated by the base station, and wherein the base station is equipped to carry out the method of claim 1.

8. A cellular telecommunication network comprising a base station for evaluating a location of a mobile station within the cellular telecommunication system, wherein a cell is associated with the base station, wherein the mobile station is located within the cell, wherein a timing advance is evaluated by the base station, and wherein the cellular telecommunication network, in particular a server within the cellular telecommunication system, is equipped to carry out the method of claim 1.

9. The method of claim 1, wherein the evaluating of the estimated direct distance of th&mobile station from the base station is not based on a transmission path between the mobile station and the base station.

10. The method of claim 1, wherein the direct distance is a line-of-sight distance.

11. A method of evaluating a location of a mobile station within a cellular telecommunication system, the method comprising:

predetermining exact distances between a base station and a plurality of locations having a same timing advance, wherein said predetermination is performed for each one of a plurality of timing advances associated with a cell;

averaging the exact distances for the plurality of locations having the same timing advance, wherein said average is individually performed for each one of the plurality of timing advances;

determining a correlation among the averaged exact distances for the plurality of timing advances;

evaluating an estimated distance between a mobile station and the base station based on the correlation of the plurality of timing advances, the estimated direct distance being generally evaluated as follows:

$$rd^* = a0 + a1 \times TA + a2 \times TA^2 + a3 \times TA^3 + \ldots$$

wherein a0, a1, a2, a3, . . . are the evaluated common values and TA is the evaluated timing advance.

12. The method of claim 11, wherein the estimated distance between the mobile station and the base station is not based on a propagation time measurement.

* * * * *